(12) United States Patent
Sukhon (10) Patent No.: US 8,493,242 B2
(45) Date of Patent: Jul. 23, 2013

(54) KEY ASSEMBLY

(75) Inventor: Saleh Sukhon, Waterloo (CA)

(73) Assignee: Research In Motion Limited, Waterloo (CA)

( * ) Notice: Subject to any disclaimer, the term of this patent is extended or adjusted under 35 U.S.C. 154(b) by 763 days.

(21) Appl. No.: 12/542,230

(22) Filed: Aug. 17, 2009

(65) Prior Publication Data

US 2011/0037622 A1    Feb. 17, 2011

(51) Int. Cl.
*H03K 17/94* (2006.01)
(52) U.S. Cl.
USPC ............................. 341/22; 345/168; 345/169
(58) Field of Classification Search
USPC .......................................................... 341/22
See application file for complete search history.

(56) References Cited

U.S. PATENT DOCUMENTS

| 7,378,991 | B2 * | 5/2008 | Dietz et al. | 341/22 |
| 7,898,440 | B2 * | 3/2011 | Chen | 341/22 |
| 8,164,570 | B2 * | 4/2012 | Dietz et al. | 345/168 |
| 2007/0229318 | A1 * | 10/2007 | Chen | 341/22 |

FOREIGN PATENT DOCUMENTS

WO    WO 2005060220 A1    6/2005

OTHER PUBLICATIONS

EESR of the corresponding EP Patent Application No. 09168018.1, dated Feb. 2, 2010.

* cited by examiner

*Primary Examiner* — Khai M Nguyen
(74) *Attorney, Agent, or Firm* — Ridout & Maybee LLP (57) ABSTRACT

A key assembly comprising: a key housing; at least one key, wherein each one of the at least one key is coupled to the key housing for sliding movement relative to the key housing and is positionable relative to the key housing in a respective first key position and its disposition in the respective first key position effects a transmission of a signal associated with the respective first key position; wherein each one of the at least one key is moveable by an operative movement relative to the key housing between the respective first key position and at least another key position and the operative movement includes a sliding movement.

20 Claims, 4 Drawing Sheets

KEY ASSEMBLY

TECHNICAL FIELD

The present disclosure relates generally to key assemblies for electronic devices.

BACKGROUND

Electronic devices, in particular mobile devices, are often equipped with a keyboard or keypad to allow user input. Currently, if a full keyboard, such as a QWERTY keyboard, is desired for a mobile device, the mobile device is designed to be larger than a typical mobile phone in order to accommodate the keyboard. A larger device is often undesirable. Even where a larger keyboard can be accommodated, a smaller keyboard would be useful for allowing extra space on the device for other purposes.

Even in devices that are large enough to accommodate a full keyboard, such as a QWERTY keyboard, the keyboard is typically still smaller than that of a desktop computer. The individual keys on a keyboard of a mobile device are usually relatively small and close to each other. This increases the likelihood of a typing error.

One solution is to provide a reduced keyboard or keypad on such devices. Reduced keypads typically use a single key for multiple different inputs. For example, in a reduced keypad, a single key may be used for input of the characters "A", "B" and "C", and the user has to tap the key multiple times to select the desired character. To assist user input using a reduced keypad, text prediction algorithms, such as Sure-Type™, are often used. However, using a text prediction algorithm places extra demand on the device, using up device resources and battery power, both of which are limited on a mobile device. Further, text prediction algorithms are not error-proof, and typically cannot predict names, uncommon terms or acronyms. Thus, such algorithms often predict input different from what the user intends. Text prediction algorithms also are not convenient for typing passwords.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Figure 1:
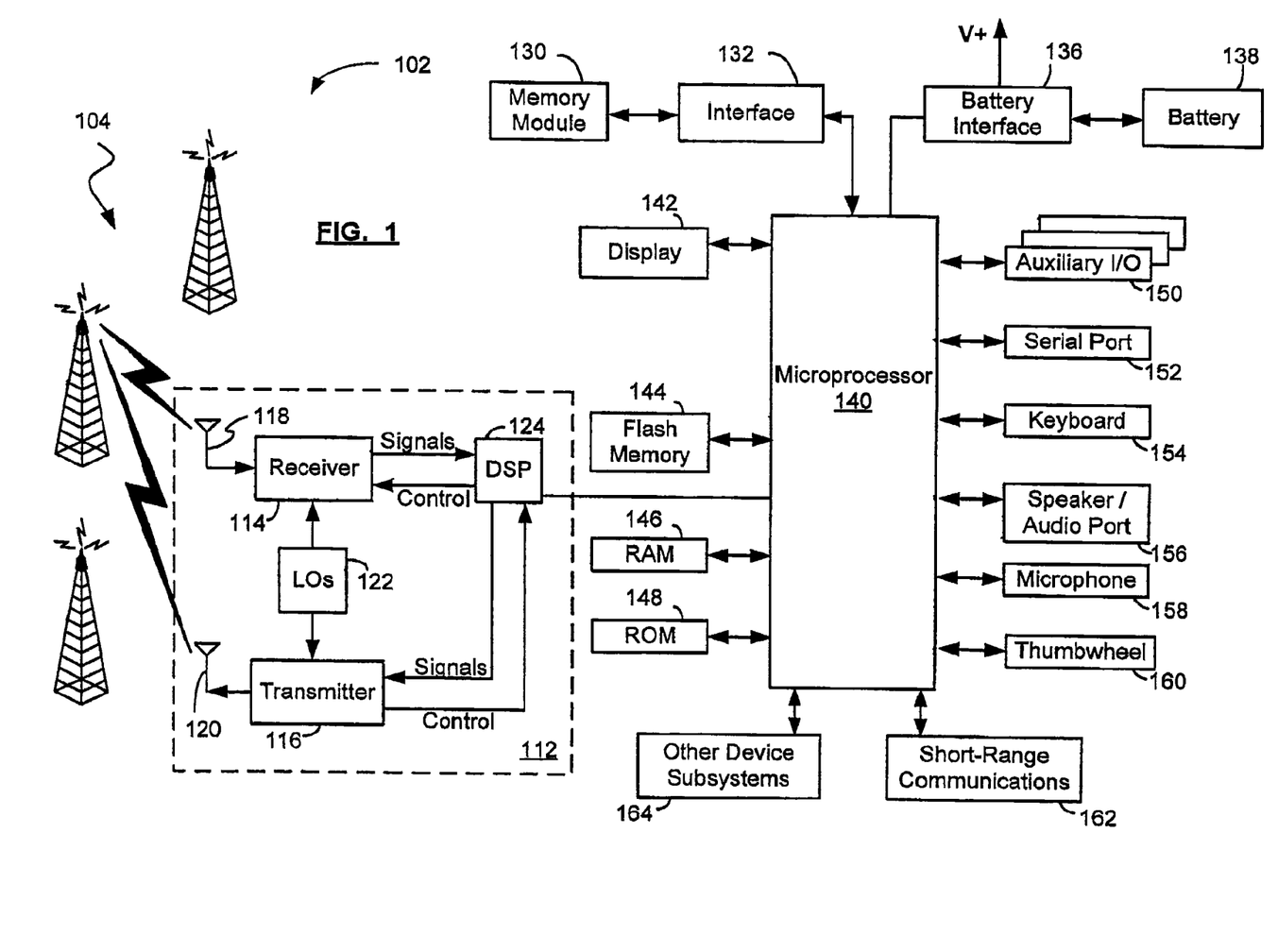
FIG. 1 shows in block diagram form an electronic device suitable for incorporating a key assembly in accordance with an example embodiment.

Reference is first made to FIG. 1, which shows a block diagram illustrating an example embodiment of an electronic device 102 suitable for incorporating a key assembly. It will be understood that references to an electronic device in this disclosure may also refer to any suitable electronic device requiring input, including a wireless device, a mobile device, or a mobile communication device. Although the disclosure presents a mobile communication device in some examples, any electronic device requiring input may be suitable. In some embodiments, the electronic device 102 communicates through a wireless communication network 104. For example, the wireless network 104 includes antennae, base stations, and supporting radio equipment as for supporting wireless communications between the electronic device 102 and other devices connected to wireless network 104. In some embodiments, the wireless network 104 is coupled to a wireless network gateway and to a wide area network (not shown).

In an example embodiment, the electronic device 102 is a two-way mobile communication device having at least voice and data communication capabilities, including the capability to communicate with other computer systems. Depending on the functionality provided by the electronic device 102, it may be referred to as a data messaging device, a two-way pager, a cellular telephone with data messaging capabilities, a wireless Internet appliance, or a data communication device (with or without telephony capabilities). In some embodiments, electronic device 102 communicates with any one of a plurality of fixed transceiver stations within its geographic coverage area.

In some embodiments, the electronic device 102 incorporates a communication subsystem 112, which includes a receiver 114, a transmitter 116, and associated components, such as one or more antenna elements 118 and 120, local oscillators (LOs) 122, and a processing module such as a digital signal processor (DSP) 124. In some embodiments, the antenna elements 118 and 120 may be embedded or internal to the electronic device 102. In some embodiments, the particular design of the communication subsystem 112 depends on the wireless network 104 in which the electronic device 102 is intended to operate.

In some embodiments, the electronic device 102 sends and receives communication signals over the wireless network 104 after the required network registration or activation procedures have been completed. Signals received by the antenna 118 through the wireless network 104 are input to the receiver 114, which, for example, performs such common receiver functions as signal amplification, frequency down conversion, filtering, channel selection, etc., as well as analog-to-digital (A/D) conversion. A/D conversion of a received signal may allow more complex communication functions such as demodulation and decoding to be performed in the DSP 124. In a similar manner, signals to be transmitted are processed, including modulation and encoding, for example, by the DSP 124. In some embodiments, these DSP-processed signals are input to the transmitter 116 for digital-to-analog (D/A) conversion, frequency up conversion, filtering, amplification, and transmission to the wireless network 104 via the antenna 120. In some embodiments, the DSP 124 not only processes communication signals, but also provides for receiver and transmitter control. For example, the gains applied to communication signals in the receiver 114 and the transmitter 116 is adaptively controlled through automatic gain control algorithms implemented in the DSP 124.

In some embodiments, network access is associated with a subscriber or user of the electronic device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). In some embodiments, the SIM card is inserted in or connected to an interface 132 of the electronic device 102 in order to operate in conjunction with the wireless network 104. Alternatively, the electronic device 102 includes an integrated identity module for use with systems such as Code Division Multiple Access (CDMA) systems.

In an example embodiment, the electronic device 102 also includes a battery interface 136 for receiving one or more rechargeable batteries 138. The battery 138 provides electrical power to at least some of the electrical circuitry in the electronic device 102, and the battery interface 136, for example, provides a mechanical and electrical connection for the battery 138. In some embodiments, the battery interface 136 is coupled to a regulator (not shown) which provides power V+ to the circuitry of the electronic device 102.

The electronic device 102 includes a microprocessor 140 which controls the overall operation of the electronic device 102. In some embodiments, communication functions, including at least data and voice communications, are performed through the communication subsystem 112. In some embodiments, the microprocessor 140 also interacts with additional device subsystems such as a display 142, a flash memory 144, a random access memory (RAM) 146, a read-only memory (ROM) 148, auxiliary input/output (I/O) subsystems 150, a data port such as serial port 152, a keyboard or keypad 154, a speaker or audio port 156 for connecting to, for example a set of headphones or an earpiece, a microphone 158, a clickable thumbwheel or thumbwheel 160, a short-range communications subsystem 162, and any other device subsystems generally designated as 164. In some embodiments, some of the subsystems shown in FIG. 1 perform communication-related functions, whereas other subsystems may provide "resident" or on-device functions. Notably, some subsystems, such as the keypad 154, the display 142, and the clickable thumbwheel 160, for example, are used for both communication-related functions, such as displaying notifications or entering a text message for transmission over the wireless network 104, and executing device-resident functions such as a clock, a calculator or a task list. In some embodiments, operating system software used by the microprocessor 140 is stored in a persistent store such as the flash memory 144, which may alternatively be the ROM 148 or similar storage element. For example, the operating system, specific device applications, or parts thereof, is temporarily loaded into a volatile store such as the RAM 146.

The microprocessor 140, in addition to its operating system functions, enables execution of software applications on the electronic device 102. A predetermined set of applications that control basic device operations, including data and voice communication applications, may normally be installed on the electronic device 102 during or after manufacture. In some embodiments, the electronic device 102 includes a personal information manager (PIM) application having the ability to organize and manage data items relating to a user such as, but not limited to, instant messaging, email, calendar events, voice mails, appointments, and task items. One or more memory stores are available on the electronic device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

In some embodiments, the PIM and/or media applications have the ability to send and receive data items via either the wireless network 104 or a link to a computer system. The link to the computer system may be via the serial port 152 or the short-range communications subsystem 162. In an example embodiment, PIM and/or media data items are seamlessly combined, synchronized, and updated via the wireless network 104, with the electronic device user's corresponding data items stored and/or associated with a host computer system thereby creating a mirrored or partially mirrored host computer on the electronic device 102 with respect to such items. This may be useful where the host computer system is the electronic device user's office computer system. In some embodiments, additional applications are also loaded onto the electronic device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. For example, such flexibility in application installation increases the functionality of the electronic device 102 and may provide enhanced on-device functions, communication-related functions, or both. For example, secure communication applications may enable electronic commerce functions and other such financial transactions to be performed using the electronic device 102.

In a data communication mode, a received data signal representing information such as a text message, an email message, a media file to be transferred, or Web page download is processed by the communication subsystem 112 and input to the microprocessor 140. In some embodiments, the microprocessor 140 further processes the signal for output to the display 142, or alternatively to the auxiliary I/O device 150. In some embodiments, a user of the electronic device 102 also composes data items, such as email messages, for example, using the keypad 154 and/or the clickable thumbwheel 160 in conjunction with the primary display 142 and possibly the auxiliary I/O device 150. For example, these composed items are transmitted through the communication subsystem 112 over the wireless network 104 or via the short range communication subsystem 162.

In some embodiments, for voice communications, the overall operation of the electronic device 102 is similar, except that the received signals may be output to the speaker or audio port 156 and signals for transmission would be generated by a transducer such as the microphone 158. In some embodiments, alternative voice or audio I/O subsystems, such as a voice message recording subsystem, is also be implemented on the electronic device 102. Although voice or audio signal output is typically accomplished primarily through the speaker or audio port 156, the display 142 is also used to provide, for example, an indication of the identity of a calling party, duration of a voice call, or other voice call related information. For example, stereo headphones or an earpiece is also used in place of the speaker 156.

In some embodiments, the serial port 152 is normally implemented in a personal digital assistant (PDA) type communication device for which synchronization with a user's computer is a desirable, albeit optional, component. For example, the serial port 152 enables a user to set preferences through an external device or software application and may extend the capabilities of the electronic device 102 by providing for information or software downloads to the electronic device 102 other than through the wireless network 104. The alternate download path, for example, is used to load software or data files onto the electronic device 102 through a direct, reliable and trusted connection.

In some embodiments, the short-range communications subsystem 162 is an additional optional component which provides for communication between the electronic device 102 and different systems or devices, which need not necessarily be similar devices. For example, the subsystem 162 includes an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In some embodiments, the short-range communications subsystem 162 is a wireless networking communications subsystem, conforming to IEEE 802.11 standards such as one or more of 802.11b, 802.11g, or 802.11n.

Figure 2A:
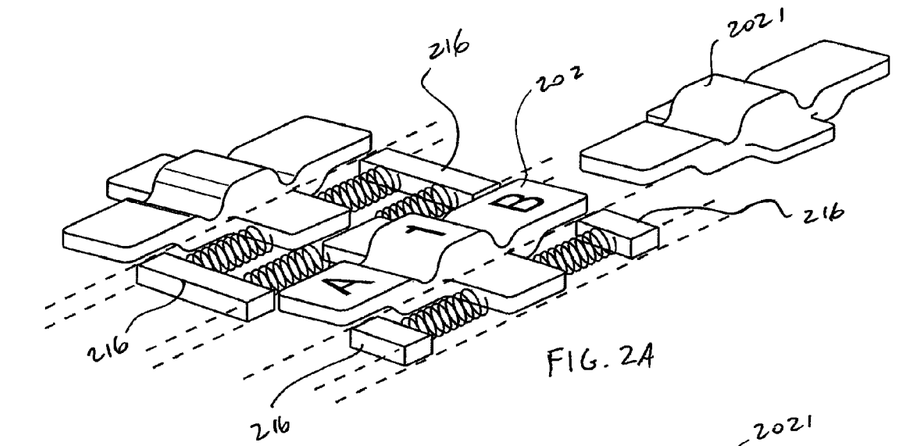
FIG. 2A is an isometric view of the key assembly in a rest position.
Figure 2B:
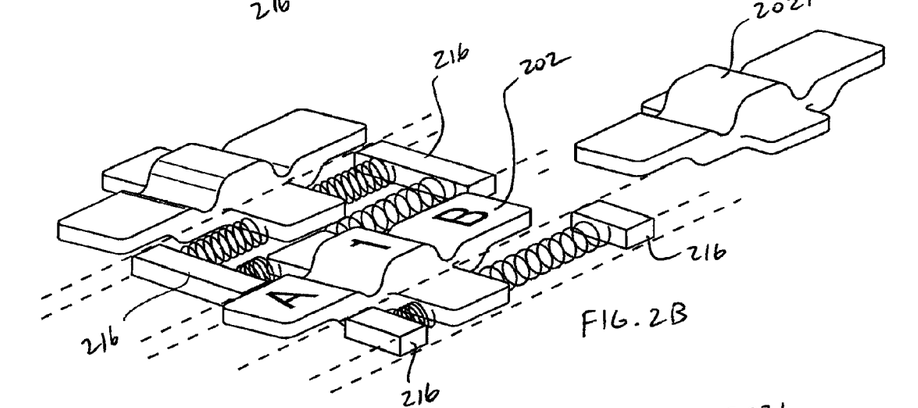
FIG. 2B is an isometric view of the key assembly in a first key position.
Figure 2C:
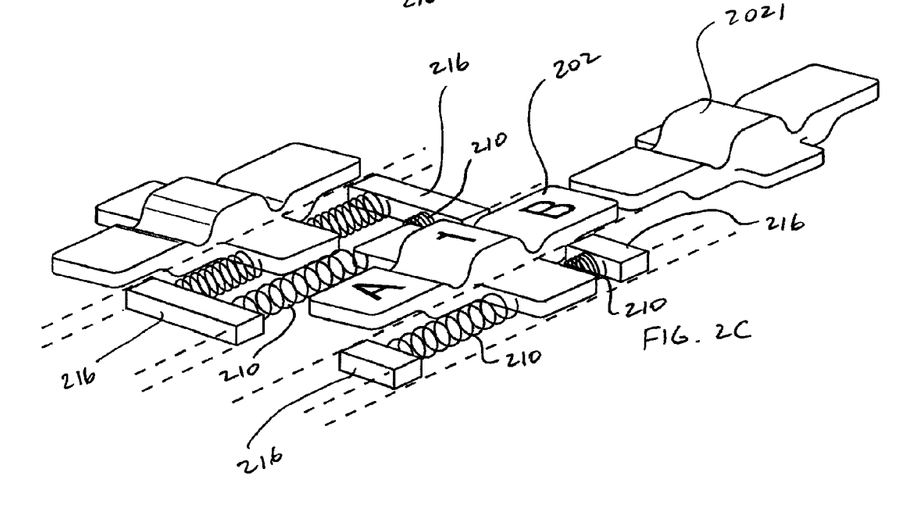
FIG. 2C is an isometric view of the key assembly in a second key position.

Reference is now made to FIGS. 2A and 2B, showing an isometric view of an example embodiment of a key assembly 200. The key assembly 200 comprises at least one key 202 slidably coupled to a key housing 204 (shown in dotted line). For simplicity and clarity, only one key 202 is discussed, however the key assembly 200 includes, in some embodiments, more than one key 202. The key 202 is positionable relative to the key housing 204 in a plurality of key positions. Where there is more than one key 202, each key 202 includes its own respective plurality of key positions, which typically do not overlap with the key positions of any other key 202. The key positions include at least one first key position (see FIG. 2B). A function or signal is triggered when the slidable key 202 is in the first key position. The key 202 is displaced from at least one other key position (for example, see FIG. 2A) to the first key position (see FIG. 2B) by way of an operative movement. The operative movement includes a sliding movement of the key 202 relative to the key housing 204. For example, the key 202 is displaced from another key position (for example, see FIG. 2A) to the first key position (see FIG. 2B) by sliding the slidable key 202 relative to the key housing 204.

Referring to FIGS. 2A, 2B, 3A, and 3B, in the example embodiment shown, the key housing 204 includes a track 208 configured to receive sliding movement of the key 202. In this example, the track 208 is configured to co-operate with a sliding component on the key 202, in this case a pair of tabs 206a, 206b. The key 202 includes tabs 206a, 206b on opposite sides 203a, 203b of the key 202 cooperating with respective tracks 208a, 208b. For example, where there are multiple keys 202, at least one of the keys 202 co-operates with the key housing 204 in this manner to effect the sliding movement.

In some embodiments, at least one of the key positions of the key 202 is a rest position (see FIG. 2A). When not in use, the key 202 is biased towards the rest position, for example by at least one biasing member 210. For example, each one of the at least one biasing member 210 is provided in the track 208. In this example, the key 202 is centered between two biasing members 210, such as coil springs, housed in the key housing 204, and providing substantially equal biasing force against the key 202. In some embodiments, there are biasing members 210 on opposite sides of the key 202. Where there are multiple keys 202, at least one of the keys 202 is biased to a rest position.

For a key which is biased towards a rest position, there is a minimum spacing of at least 2.5 millimetres between its rest position (FIG. 2A) and its first key position (FIG. 2B).

In some embodiments, the key 202 is positionable, when in the rest position, to a third key position (see FIG. 4B) by an operative movement including depression of the key 202, for example, against the key housing 204. When the key 202 is disposed in the third position, the key 202 effects transmission of a signal associated with the third position.

In the example shown, the key 202 is positionable to any one of the first key position (FIG. 2B), a second key position (FIG. 2C), and third key position (FIG. 4B), and is biased towards a rest position (see FIG. 2A). Each of the first, second and third key positions is associated with a function, and disposition of the key 202 in any one of the first, second and third key positions effects the transmission of the respective signal. In this example, the first and second key positions are associated with inputs "A" and "B", and the third key position is associated with input "1".

The key 202 includes an operative surface 212 that extends beyond the key housing 204. The operative surface 212 is configured such that it is accessible for receiving an application of manual force to effect the operative movement. For example, the manual force for which the operative surface 212 is configured to receive includes a compressive force (to effect depression of the key to the third key position (FIG. 4C)). For example, the operative surface 212 includes indication of inputs or functions associated with respective functional key positions. For example, the operative surface includes a raised portion 214, which may be resilient, to facilitate disposition of the key 202 to the third key position, such as by depression of the key 202 against the key housing 204.

At the rest position (see FIG. 2A), the key 202 is biased to be disposed over the third key position (see FIG. 4C) in an undepressed state. Depression of the key 202 disposes the key 202 to the third key position (see FIG. 4C), effecting the transmission of a signal representing the input "1". The key 202 is slidable to either one of the first or second key positions (FIGS. 2B, 2C) from the rest position (FIG. 2A). Sliding the key 202 in the direction corresponding to the indicated "A" input disposes the key 202 to the key position associated with the "A" input (ie. the first key position, FIG. 2B) and effects the transmission of a signal representing the input "A". Similarly, sliding the key 202 in the direction corresponding to the indicated "B" input disposes the key 202 to the key position associated with the "B" input (ie. the second key position, FIG. 2C) and effects transmission of a signal representing the input "B". In some embodiments, to effect displacement of the key to either of the first and second key position, a manual force is applied to the key and overcomes any biasing force being applied to the key 202 to bias the key 202 towards the rest position.

In the example shown, the key assembly 200 includes a spacer 216 disposed in the track 208. The spacer 216 is fixed in the track 208 and serves to limit the sliding movement of the key 202. The spacer 216 functions as a detent to stop the sliding movement of the key 202 once the key 202 reaches the first or second key position. The spacer 216 also serves to prevent the key 202 from coming up against an adjacent key 202l and interfering with the movement of the adjacent key 202l. In other examples, the key assembly 200 does not include the spacer 216, but rather limits the sliding movement of the key 202 by designing the key housing 204 to constrain the possible extent of sliding movement available to the key 202, for example, by forming a frame around the key 202.

Although the example shown illustrates a key assembly 200 that provides for sliding movement only along one axis, the key assembly 200, in some embodiments, permits sliding movement in two or more axes. While the example key 202 is shown positionable in the first and second key positions from another key position by an operative movement including a sliding movement, the key 202, in some embodiments, is positionable to other key positions, from another key position, by an operative movement including a sliding movement, and when the key is disposed in any one of these other key positions, a respective signal associated with such key position is transmitted. Also, while the example key 202 is shown positionable in a third key position from a rest position by an operative movement including depression of the key 202, the key 202, in some embodiments, is positionable to other depressed key positions, each from a respective other rest position, by an operative movement including depression of the key 202, and when the key 202 is disposed in any one of these other depressed key positions, a respective signal associated with such depressed key position is transmitted.

Figure 3A:
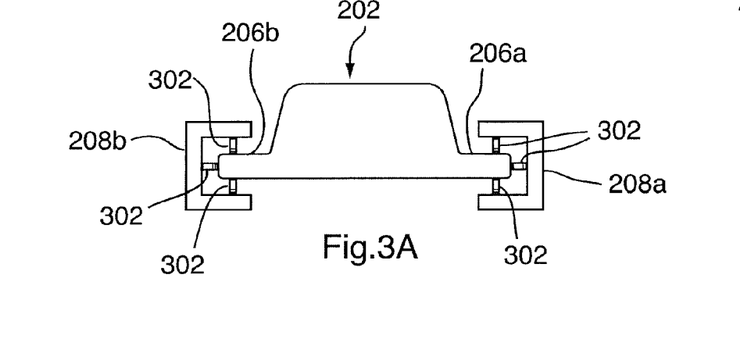
FIG. 3A is a cross-sectional view of a key of the key assembly disposed in a track of the key assembly.
Figures 3B, 5:
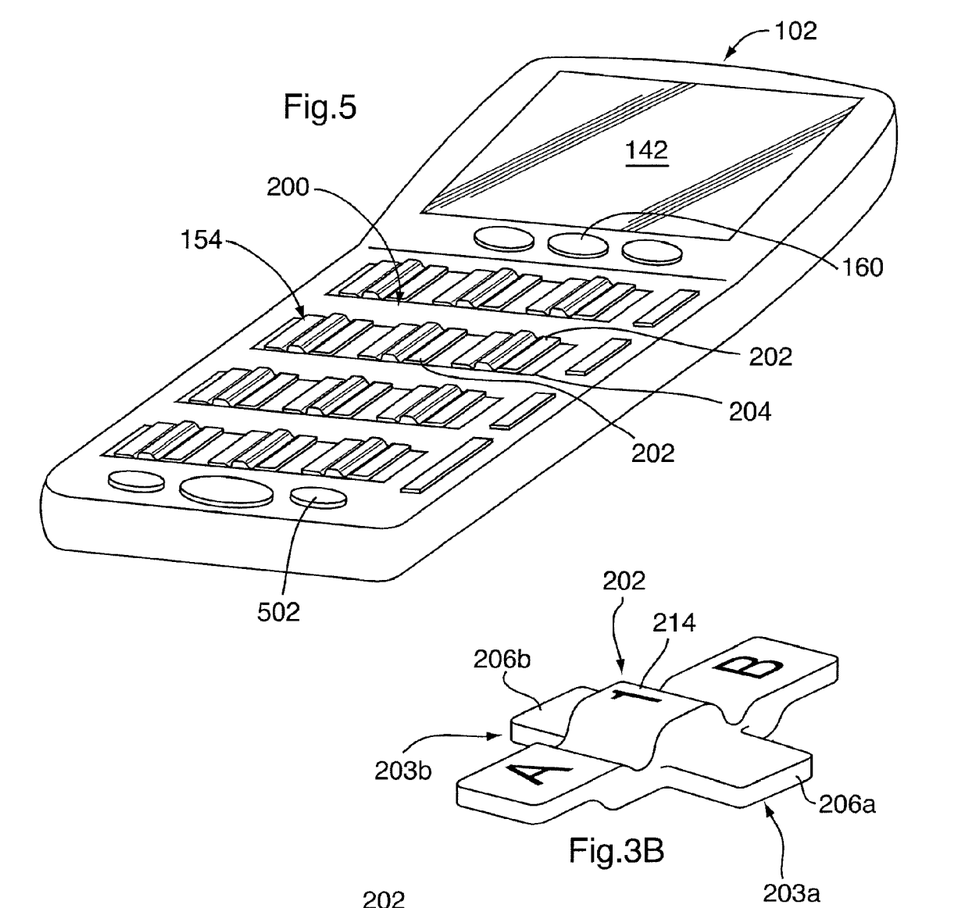
FIG. 3B is a top perspective view of a key of the key assembly.
FIG. 5 is an isometric view of an electronic device having a key assembly, in accordance with an example embodiment.

Reference is now made to FIGS. 3A and 3B, showing a cross-sectional view of an example key 202 of the key assembly 200 of FIG. 2. The key assembly 200 also includes a respective one or more rollers 302 for positioning each one of the tabs 206a, 206b in the respective tracks 208a, 208b and for facilitating movement of each one of the tabs 206a, 206b within the respective tracks 208a, 208b.

Reference is now made to FIGS. 4A-4D, showing, in operation, a cross-sectional view of the example key assembly 200 in a rest position, third key position, first position and second key position, respectively.

In this example, the key assembly 200 includes appendages 402, 404a, 404b that cooperate with the key 202 and switches 406a, 406b, 406c for facilitating detection of the key position. The appendages 402, 404a, 404b and the switches 406a, 406b, 406c are located between the key 202 and the key housing 204. Appendage 402 is relatively rigid and cooperates with the key 202 to facilitate detection of the third key position by the switch 406b. Appendages 404a, 404b are relatively rigid and tiltable, and cooperate with the key 202 to facilitate detection of the first and second key positions by the switches 406a, 406c respectively.

Figure 4A:
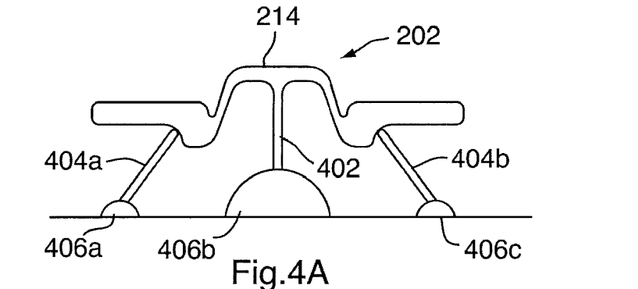
FIGS. 4A-4D are cross-sectional views of a key of the key assembly.

FIG. 4A illustrates the key 202 in a rest position. In this example, biasing members (not shown) bias the key 202 towards a rest position that is approximately centered between the first and second key positions. The key 202 is also biased away from the third key position, for example by designing the key 202 to include a resilient raised portion 214 that is biased away from the third key position. In the rest position (FIG. 4A), each one of the appendages 402, 404a, 404b is disposed such that each one of the switches 406a, 406b, 406c is unactuated. In the example shown, the appendage 402 extends from the key 202 towards the switch 406b. The appendages 404a, 404b extend from the switches 406a, 406c irrespectively, towards the key 202 in a tilted manner.

Figure 4B:
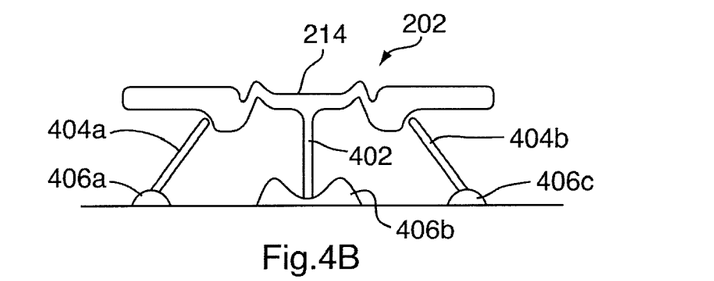

FIG. 4B illustrates the key 202 in the third key position. In this example, the appendage 402 is compressed towards the switch 406b, triggering the switch 406b. Thus, the disposition of the key 202 in the third key position is detected and a signal representing the function associated with the third key position is transmitted.

Figure 4C:
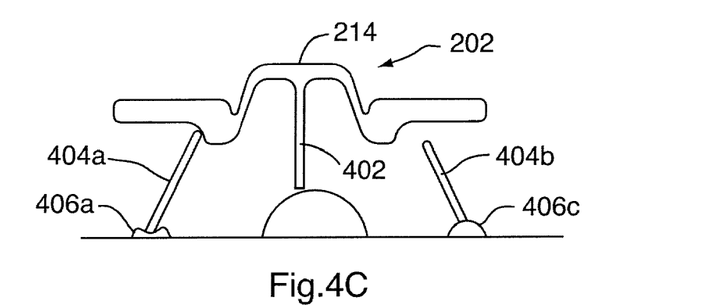

FIG. 4C illustrates the key 202 in a first key position. In this example, the appendage 404a is rotated so that it is straightened from its initial tilted position. In some embodiments, key 202 includes a protrusion 408a that cooperates with the appendage 404a to cause it to rotate when the key 202 is disposed to the first key position. When the appendage 404a is straightened, it is compressed towards the switch 406a, triggering the switch 406a. Thus, the disposition of the key 202 in the first key position is detected and a signal representing the function associated with the first key position is transmitted.

Figure 4D:
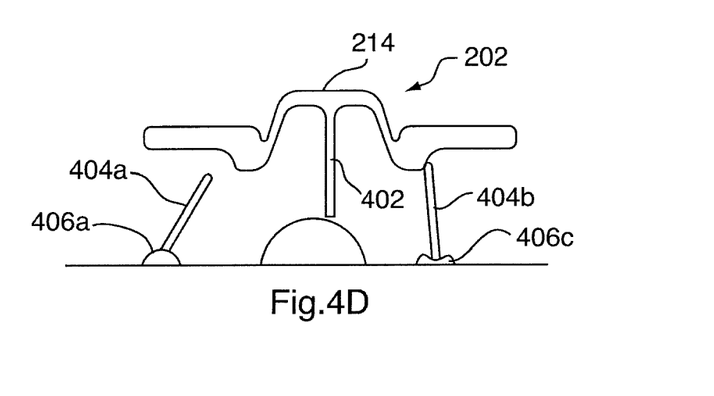

FIG. 4D illustrates the key in a second key position. In this example, the appendage 404b is rotated so that it is straightened from its initial tilted position. In some embodiments, the key 202 includes a protrusion 408b that co-operates with the appendage 404b to cause it to rotate when the key is disposed to the second key position. When the appendage 404b is straightened, it is compressed towards the switch 406c, triggering the switch 406c. Thus, the disposition of the key 202 in the second position is detected and a signal representing the function association with the second key position is transmitted.

Although the example illustrates the use of appendages 402, 404a, 404b and switches 406a, 406b, 406c to detect the key position of the key 202, other arrangements and methods may be suitable. For example, other arrangements may use protrusions in place of one or more appendages 402, 404a, 404b, or electrical contacts in place of switches 406a, 406b, 406c. Although the example illustrates a key 202 suitable for disposition in first, second and third key positions, a similar arrangement may be used for a key 202 configured to transmit more than three separate and independent electrical signals. Other arrangements may accommodate a key 202 that is not necessarily biased towards a rest position.

Reference is now made to FIG. 5, illustrating the electronic device 102 suitable for incorporating the key assembly 200. In the example shown, the electronic device 102 is a mobile communication device. The keyboard 154 includes the key assembly 200.

In some embodiments, in addition to one or more keys 202, the keyboard 154 includes conventional keys 502. For example, the conventional keys 502 are used for input in addition to the keys 202. In the example shown, the keys 202 are arranged in rows and columns, similar to a reduced keypad, and together they provide the input characters typically found in a QWERTY keyboard. Other arrangements may be suitable, for example to accommodate other keyboard layouts. In some embodiments, the electronic device 102 includes at least one key 202 not included in the keyboard 154.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A key assembly, comprising:
a key housing;
at least one key coupled to the key housing for sliding movement relative to the key housing and is positionable relative to the key housing in a first key position and its disposition in the first key position effects a transmission of a first signal associated with the first key position;
a first switch located below the at least one key;
a first appendage located below the at least one key for triggering the first switch, the first appendage extending towards the first switch and being tilted at an acute angle relative to a plane of the sliding movement;
wherein the at least one key is moveable by sliding movement relative to the key housing between at least one other key position and the first key position, wherein the sliding movement of the at least one key from the at least one other key position to the first key position rotates the first appendage from an initial tilted position to a straightened position which triggers the first switch causing transmission of the first signal associated with the first key position.

2. The key assembly as claimed in claim 1, further comprising: a first protrusion located below the at least one key which cooperates with the first appendage for triggering the first switch.

3. The key assembly as claimed in claim 1, wherein the at least one key is positionable in a second key position and the disposition of the key in the second key position effects a transmission of a second signal associated with the second key position, and wherein the at least one key is moveable by sliding movement relative to the key housing between at least one other key position and the second key position.

4. The key assembly as claimed in claim 3, further comprising:
   a second switch located below the at least one key;
   a second appendage located below the at least one key for triggering the second switch, the second appendage extending towards the second switch and being tilted at an acute angle relative to a plane of the sliding movement;
   wherein the sliding movement of the at least one key from the at least one other key position to the second key position rotates the second appendage from an initial tilted position to a straightened position which triggers the second switch causing transmission of the second signal associated with the second key position.

5. The key assembly as claimed in claim 4, further comprising: a second protrusion located below the at least one key which cooperates with the second appendage for triggering the second switch.

6. The key assembly as claimed in claim 3, wherein there is a minimum distance of at least 2.5 millimeters between the first and second key positions.

7. The key assembly as claimed in claim 1, wherein the at least one key is positionable in a rest position and is biased towards disposition in the rest position, the key assembly further comprising at least one biasing member for biasing the at least one key towards disposition in the rest position.

8. The key assembly as claimed in claim 7, wherein there is a minimum spacing distance of at least 2.5 millimeters between the rest position and the first key position.

9. The key assembly as claimed in claim 1, wherein the at least one key is positionable in a third key position and the disposition of the at least one key in the third key position effects transmission of a third signal associated with the third key position, wherein the at least one key is moveable from at least one other key position by depression of the at least one key relative to the key housing from at least one other key position to the third key position.

10. The key assembly as claimed in claim 9, further comprising:
    a third switch located below the at least one key;
    a third appendage located below the at least one key and above the third switch for triggering the third switch, the third appendage being substantially perpendicular to a plane of the sliding movement;
    wherein the depression of the at least one key from the at least one other key position to the third key position moves the third appendage downwards which triggers the third switch causing transmission of the third signal associated with the third key position.

11. The key assembly as claimed in claim 10, wherein the at least one key is moveable from the rest position by depression of the at least one key relative to the key housing from the rest position to the third key position.

12. The key assembly as claimed in claim 1, wherein the key housing includes a track configured to receive sliding movement of the at least one key.

13. The key assembly as claimed in claim 12, wherein the at least one key is received within the track and includes an operative surface extending beyond the housing which is contoured to receive an application of manual force to effect the sliding movement.

14. The key assembly as claimed in claim 13, wherein the operative surface includes a raised surface.

15. The key assembly as claimed in claim 12, wherein the at least one key includes a pair of tabs on opposite sides for sliding component of the at least one key within the track.

16. The key assembly as claimed in claim 15, further comprising rollers for positioning each of the tabs in respective tracks and for facilitating movement of each of the tabs within the respective tracks.

17. The key assembly as claimed in claim 1, further comprising a detent configured to limit movement of the at least one key and thereby prevent interference with movement of an adjacent key.

18. A key assembly, comprising:
    a key housing;
    at least one key coupled to the key housing for sliding movement relative to the key housing and is positionable relative to the key housing in a first key position and its disposition in the first key position effects a transmission of a first signal associated with the first key position;
    a first switch located below the at least one key;
    wherein the at least one key includes a first protrusion extending below the at least one key for triggering the first switch, the first protrusion extending towards the first switch and being tilted at an acute angle relative to a plane of the sliding movement;
    wherein the at least one key is moveable by sliding movement relative to the key housing between at least one other key position and the first key position, wherein the sliding movement of the at least one key from the at least one other key position to the first key position moves the first protrusion which triggers the first switch causing transmission of the first signal associated with the first key position.

19. The key assembly as claimed in claim 18, wherein the at least one key is positionable in a second key position and the disposition of the key in the second key position effects a transmission of a second signal associated with the second key position, and wherein the at least one key is moveable by sliding movement relative to the key housing between at least one other key position and the second key position;
    wherein the key assembly further comprises:
    a second switch located below the at least one key;
    wherein the at least one key includes a second protrusion extending below the at least one key for triggering the second switch, the second protrusion being located opposite to the first protrusion extending towards the first switch and being tilted at an acute angle relative to the plane of the sliding movement;
    wherein the at least one key is moveable by sliding movement relative to the key housing between at least one other key position and the second key position, wherein the sliding movement of the at least one key from the at least one other key position to the second key position moves the second protrusion which triggers the second switch causing transmission of the second signal associated with the second key position.

20. An electronic device, comprising:
    a key assembly including:
    a key housing;
    at least one key coupled to the key housing for sliding movement relative to the key housing and is positionable relative to the key housing in a first key position and its disposition in the first key position effects a transmission of a first signal associated with the first key position;

a first switch located below the at least one key;

a first appendage located below the at least one key for triggering the first switch, the first appendage extending towards the first switch and being tilted at an acute angle relative to a plane of the sliding movement;

wherein the at least one key is moveable by sliding movement relative to the key housing between at least one other key position and the first key position, wherein the sliding movement of the at least one key from the at least one other key position to the first key position rotates the first appendage from an initial tilted position to a straightened position which triggers the first switch causing transmission of the first signal associated with the first key position;

a microprocessor configured to effect a response based on signals transmitted by the disposition of the at least one key into one of a number of key positions including the first key position.

\* \* \* \* \*